United States Patent [19]

Ohba et al.

[11] 4,408,934

[45] Oct. 11, 1983

[54] DRILLING MACHINE

[75] Inventors: Hiroshi Ohba; Shigeo Wakamatsu, both of Tokyo, Japan

[73] Assignee: Tokyo Shibaura Denki Kabushiki Kaisha, Kawasaki, Japan

[21] Appl. No.: 260,396

[22] Filed: May 4, 1981

[30] Foreign Application Priority Data

May 9, 1980 [JP] Japan .................................. 55-61329

[51] Int. Cl.[3] ........................ B23B 39/16; B23B 47/26; B26D 7/02

[52] U.S. Cl. ......................................... 408/51; 408/52; 408/95; 408/98

[58] Field of Search ....................... 408/51, 95, 98, 100, 408/107, 96, 97, 110, 111, 112, 42, 49, 50, 52, 53, 68; 83/380, 389, 143, 29

[56] References Cited

U.S. PATENT DOCUMENTS

| | | | |
|---|---|---|---|
| 949,195 | 2/1910 | McBee | 408/51 X |
| 1,710,744 | 4/1929 | Roe | 408/52 X |
| 2,749,561 | 6/1956 | Rush | 408/98 X |
| 3,122,867 | 3/1964 | Gross | 408/95 X |
| 3,684,391 | 8/1972 | Liouville et al. | 408/51 X |
| 4,061,436 | 12/1977 | Durrer | 408/98 X |

FOREIGN PATENT DOCUMENTS

| | | | |
|---|---|---|---|
| 1148436 | 5/1963 | Fed. Rep. of Germany | 408/98 |
| 2846770 | 5/1980 | Fed. Rep. of Germany | 408/53 |
| 54981 | 4/1967 | German Democratic Rep. | 83/389 |
| 349781 | 12/1960 | Switzerland | 408/53 |
| 1512479 | 6/1978 | United Kingdom | 408/51 |

*Primary Examiner*—Robert E. Garrett
*Assistant Examiner*—Steven B. Katz
*Attorney, Agent, or Firm*—Cushman, Darby & Cushman

[57] ABSTRACT

A drilling machine for drilling a stack of paper, comprises a first movable member moving along directions to press the stack of paper and to remote from the stack of paper and elastically supporting a pressing plate, a second movable member supporting a drilling mechanism and moving along the directions, and a control device for causing first and second driving mechanisms simultaneously to drive the first and second movable members respectively in the direction to release the stack of paper from compression and to separate the drilling mechanism from the stack of paper, whereby the stack of drilled paper is released from compression and the drilling mechanism is separated from the stack of drilled paper.

20 Claims, 9 Drawing Figures

DRILLING MACHINE

The present invention relates to a drilling machine for boring holes through a stack of paper by means of drills, more specifically to a drilling machine for drilling a stack of paper while compressing the same.

Generally, in drilling papers or sheets, rotating drills are passed through the sheets which have been compressed by means of a link mechanism, thereby boring holes through the sheets. After boring the holes, the drills are removed from the sheets, and then the sheets are released from the compression. Thus, a series of drilling processes are completed.

Using such drilling processes, the drilling machine can be simple in construction. Conventionally, however, it has been impossible to reduce the time required for a cycle of the drilling processes in order to improve the productivity.

The present invention is contrived in consideration of the aforementioned circumstances, and is intended to provide a drilling machine for papers or sheets capable of releasing the sheets from compression immediately on pulling out drills from the sheets after drilling, thereby ensuring high-speed drilling operation.

According to an aspect of the present invention, there is provided a drilling machine for drilling a stack of paper, which comprises a fixed table, a pressing plate disposed movably, holding a stack of paper between said plate and the table pressing the stack of paper against the table, a first movable member moving along directions to press the stack of paper and to remote from the stack of paper and elastically supporting the pressing plate, a drilling mechanism disposed rotatably and movably for drilling the stack of paper pressed by the pressing plate, a second movable member supporting the drilling mechanism and moving along the directions, a first driving mechanism for moving the first movable member in the direction to compress the stack of paper and in the other direction to release the stack of paper from such compression, a second driving mechanism for driving the second movable member to move in the direction to cause the drilling mechanism to drill the stack of paper and in the other direction to separate the drilling mechanism from the stack of paper, and a control device for causing the first and second driving mechanisms simultaneously to drive the first and second movable members respectively in the other directions, whereby the stack of drilled paper is released from the compression and the drilling mechanism is separated from the stack of drilled paper.

This invention can be more fully understood from the following detailed description when taken in conjunction with the accompanying drawings, in which.

Now there will be described one embodiment of the drilling machine of the present invention with reference to the accompanying drawings of FIGS. 1 to 8.

Figure 1:
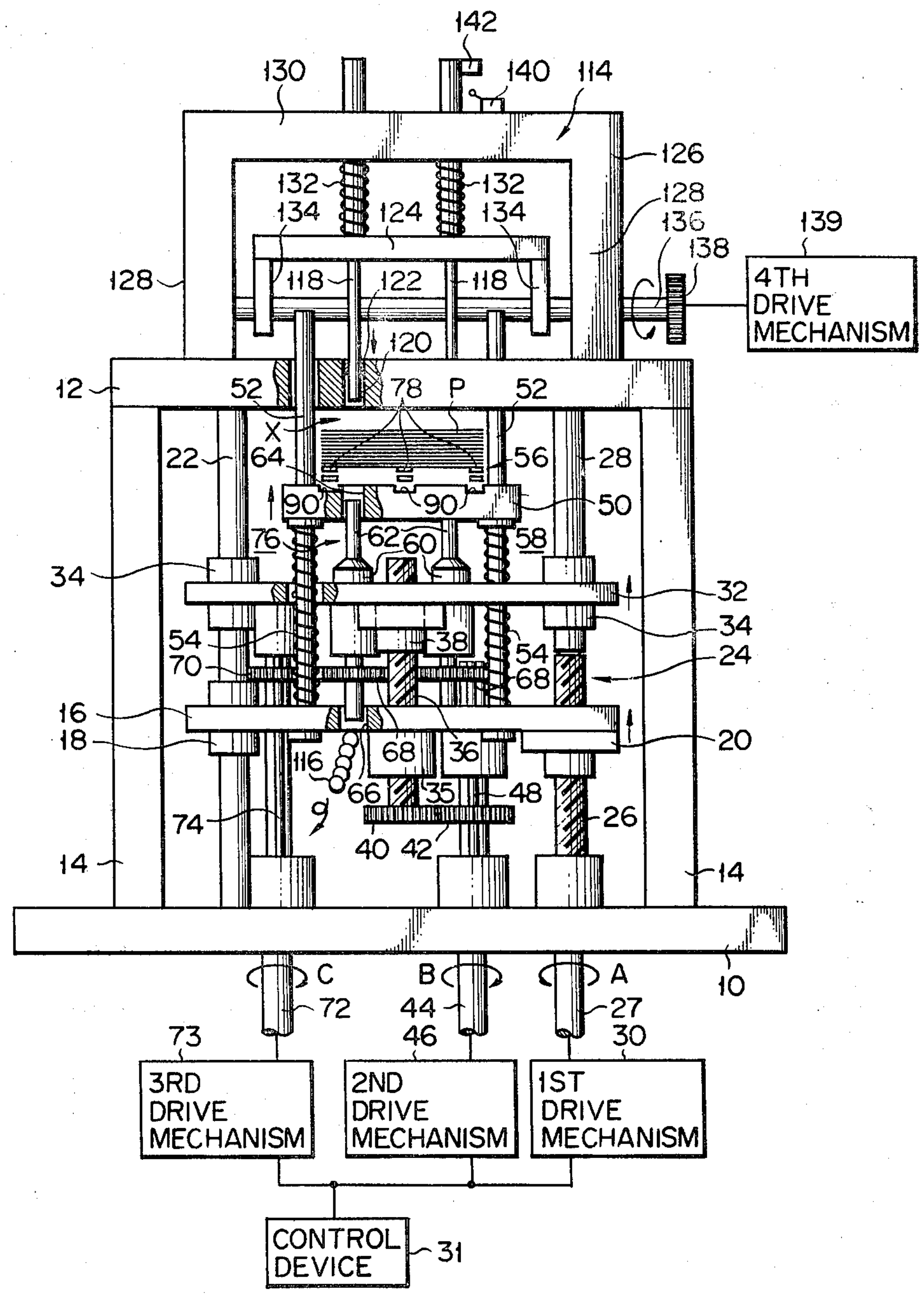
FIG. 1 is a front view showing one embodiment of the drilling machine according to this invention.

Referring now to the drawing of FIG. 1, reference numeral 10 designates a horizontally extending fixed base of the drilling machine. A table 12 is disposed over the fixed base 10 in parallel therewith. The fixed base 10 and the table 12 are fixedly coupled by means of a plurality of props 14.

Between the fixed base 10 and the table 12 lies a first movable member or base 16 which extends in parallel with the fixed base 10 and can move vertically. The first movable base 16 is in the form of a rectangular plate. Slide bearings 18 allowing free vertical movement of the first movable base 16 are disposed in three corners of the base 16, while a screw guide 20 for defining the vertical position of the base 16 is located in the remaining corner. Each of the slide bearings 18 is fitted on the outer circumference of its corresponding one of cylindrical guide shafts 22 which extend along the vertical direction. The upper and lower ends of each guide shaft 22 are fixed to the under side of the table 12 and the top side of the fixed base 10, respectively. The screw guide 20 intermeshes with a screw portion 26 of a guide shaft 24 with ball screw capable of rotating on its own axis. The screw portion 26 is formed at the lower portion of the guide shaft 24, and a cylindrical guide portion 28 is formed at the upper portion of the shaft 24. The screw portion 26 is rotatably connected to the guide portion 28. The upper end of the guide shaft 24, i.e. the upper end of the guide portion 28, is fixed to the under side of the table 12, while the lower portion of the shaft 24, i.e. the lower end of the screw portion 26, is rotatably borne by the fixed base 10. The lower end of the guide shaft 24 penetrates the fixed base 10 to extend downward therefrom, and is coaxially fixed to a first driving shaft 27. The first driving shaft 27 is coupled with a first driving mechanism 30. Under the control of a control device 31, the first driving mechanism 30 can rotate the guide shaft 24 by means of the first driving shaft 27 in the forward direction indicated by an arrow A and in the reverse direction. The ball screw portion 26 is so threaded that the first movable base 16 intermeshed with the ball screw portion 26 by means of the screw guide 20 may be moved upward when the guide shaft 24 is rotated in the forward direction.

Between the first movable base 16 and the table 12 lies a second movable member or base 32 which extends in parallel with the first movable base 16 and can move vertically. Like the first movable base 16, the second movable base 32 is in the form of a rectangular plate. Disposed in the four corners of the second movable base 32 are slide bearings 34 which allow free vertical movement of the base 32. These slide bearings 34 are fitted on the respective outer circumferences of the three guide shafts 22 and the guide portion 28 at the upper portion of the guide shaft 24 with ball screw.

A support section 35 is disposed in the center of the first movable base 16. The support section 35 supports a ball screw 36 vertically penetrating the same so that the ball screw 36 can rotate on its own axis but be prohibited from moving along the axial direction with respect to the first movable base 16. The upper end portion of the ball screw 36 is intermeshed with a screw guide 38 which is attached to the central portion of the under side of the second movable base 32. A driven gear 40 is coaxially fixed to the lower end portion of the ball screw 36. The driven gear 40 intermeshes with a driving gear 42. The driving gear 42 is fitted to a second driving shaft 44 so as to be able to move axially and rotate together therewith. The second driving shaft 44 loosely penetrates both the fixed base 10 and the first movable base 16 along the vertical direction so as to be able to rotate on its own axis. The lower end of the second driving shaft 44 is coupled with a second driving mechanism 46. Under the control of the control device 31, the second driving mechanism 46 can rotate the driving shaft 44 in the forward direction indicated by an arrow B and in the reverse direction. The ball screw 36 is so threaded that the second movable base 32 may be moved upward when the driving shaft 44 is rotated in the forward direction. Accordingly, the first movable base 16 and the second movable base 32 which axially moves in one with the first movable base 16 by means of the ball screw 36, move upward or downward with the space between them kept fixed, accompanying the forward or reverse rotation of the guide shaft 24 with ball screw. Accompanying the forward or reverse rotation of the driving shaft 44, moreover, only the second movable base 32 moves upward or downward. Namely, the space between the first and second movable bases 16 and 32 changes as the driving shaft 44 rotates.

An axially extending ridge 48 is provided on that portion of the second driving shaft 44 which is fitted with the driving gear 42. The driving shaft 44 supports the driving gear 42 so that the driving gear 42 may rotate as the driving shaft 44 rotates and that the driving gear 42 may move along the axial direction with the aid of the ridge 48. Accordingly, the driven gear 40 and the driving gear 42 can always be in mesh, so that the rotatory driving force of the driving shaft 44 is transmitted to the ball screw 36 through the driving gear 42 and the driven gear 40.

Between the second movable base 32 and the table 12 lies a pressing plate 50 which extends in parallel with the second movable base 32. The pressing plate 50 is in the form of a rectangular plate smaller than the first or second movable base 16 or 32. Four guide shafts 52 vertically penetrate the four corners of the pressing plate 50 respectively to support the same so that the pressing plate 50 can move along the vertical direction. The lower ends of the guide shafts 52 penetrate the second movable base 32 to be fixed to the first movable base 16. The upper ends of the guide shafts 52 penetrate the table 12 to extend upward therefrom. The under side of the pressing plate 50 is elastically supported by coil springs 54 which are wound around their corresponding guide shafts 52 between the pressing plate 50 and the first movable base 16. Thus, a given space is maintained between the pressing plate 50 and the second movable base 32.

When the first movable base 16 rises as the screw portion 26 rotates in the forward direction, the pressing plate 50 also rises with the aid of the guide shafts 52 and the coil springs 54. Here the space between the pressing plate 50 and the table 12 is defined as a drilling section X. A stack of paper P, which has been carried in by means of a conveying mechanism 56 as mentioned later so as to be located inside the drilling section X, is pressed against the under side of the table 12 by the pressing plate 50. Thus, the pressing plate 50, guide shafts 52, and coil springs 54 constitute a paper compressing mechanism 58.

Four drill holders 60 are disposed in predetermined positions on the second movable base 32 under the pressing plate 50. The drill holders 60 hold their corresponding drills 62 so that the drills 62 may rotate on their own axes. Each drill 62 has an edge at the upper end thereof and is in the form of a hollow cylinder. Holes 64 are vertically bored through those portions of the pressing plate 50 which face the respective upper ends of the drills 62, while holes 66 are vertically bored through those portions of the first movable base 16 which face the respective lower ends of the drills 62. When the compressing mechanism 58 shown in FIG. 1 is not in operation, the upper and lower ends of the drills 62 are located in the holes 64 and 66, respectively. Driven gears 68 are coaxially fixed to those portions of the drills 62 which are located below their corresponding drill holders 60. These driven gears 68 are intermeshed with one another. One of the driven gears 68 is intermeshed with a driving gear 70. The driving gear 70 is mounted on a third driving shaft 72 which loosely penetrates the fixed base 10 and the first movable base 16 along the vertical direction so as to be able to rotate on its own axis. An axially extending ridge 74 is formed on that portion of the third driving shaft 72 which is fitted with the driving gear 70, and the driving gear 70 is mounted on the third driving shaft 72 so as to be movable along the axial direction and rotatable together with the shaft 72 with the aid of the ridge 74. The lower end of the third driving shaft 72 is coupled with a third driving mechanism 73. Under the control of the control device 31, the third driving mechanism 73 can rotate the third driving shaft 72 in the forward direction indicated by an arrow C and in the reverse direction. Accordingly, the driven gear 68 and the driving gear 70 can always be in mesh, so that the rotatory driving force of the driving shaft 72 is transmitted to the drills 62 through the driving gear 70 and the driven gear 68. Thus, the drill holders 60, drills 62, and driving mechanism 73 constitute a drilling mechanism 76.

Figure 2:
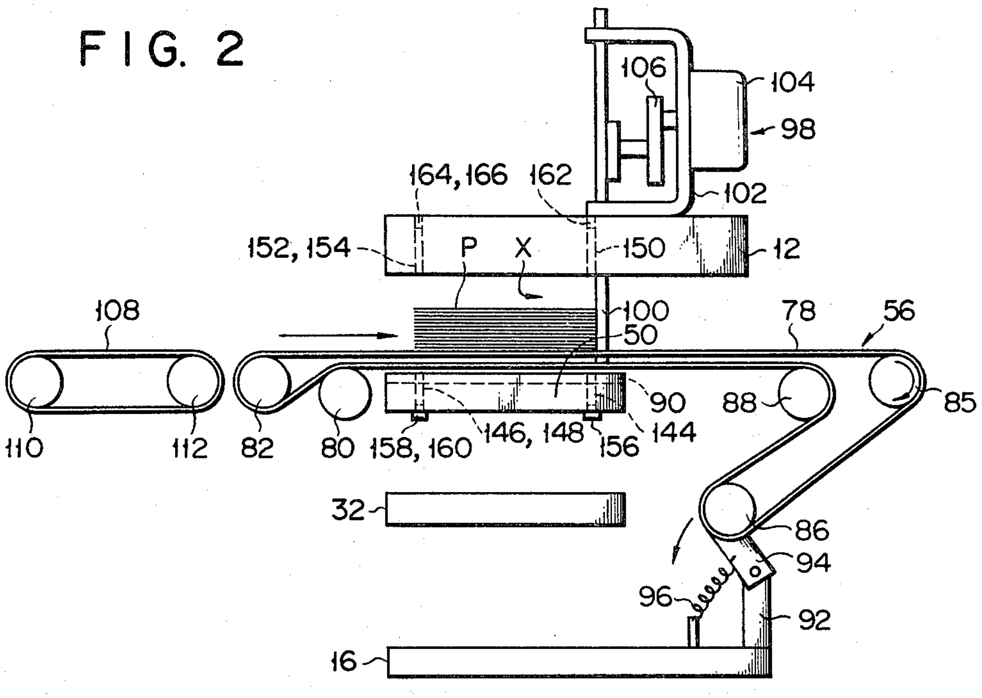
FIG. 2 is a side view of a conveying mechanism used in the drilling machine of FIG. 1.

The foresaid conveying mechanism 56 for the stack of paper P is constructed as shown in FIG. 2. Three parallel endless belts 78 for carrying the stack of paper P are arranged at intervals of a prescribed distance within the same plane. These belts 78 are stretched between two idle rollers 80 and 82 located on the supply side, a first driving roller 84 located on the delivery side, a tension roller 86 mounted on the first movable base 16, and an idle roller 88 located on the delivery side. These belts 78 are replaceable. All of these rollers except the tension roller 86, that is, the rollers 80, 82, 84 and 88 are rotatably mounted on support arms (not shown) that are attached to the table 12. In other words, the rollers 80, 82, 84 and 88 keep their positions fixed. The belts 78 have both their forward and backward paths located between the pressing plate 50 and the stack of paper P.

Figure 3:
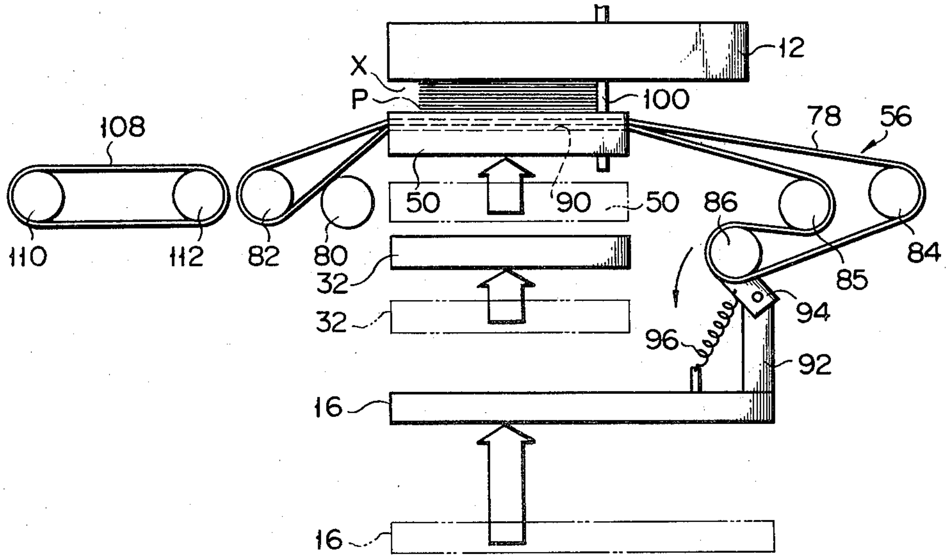
FIG. 3 is a side view of the conveying mechanism of FIG. 2 in a different operating state.

Grooves 90 are formed on those portions of the top side of the pressing plate 50 which severally face the belts 78. When the compressing mechanism 58 is in its operating state, as shown in FIG. 3, the belts 78 are located in the corresponding grooves 90. Here, the belts 78 and the grooves 90 are kept away from the drills 62.

As shown in FIG. 2, a fixed arm 92 stands upright in a predetermined position on the first movable base 16. A movable arm 94 is rotatably mounted on the upper end of the fixed arm 92, and the foresaid tension roller 86 is rotatably mounted on the tip end of the movable arm 94. A spring 96 is disposed between the movable arm 94 and the first movable base 16, urging the movable arm 94 toward the first movable base 16. The movement of the tension roller 86 offsets a change in the tension of the belts 78 which is caused when the belts 78 are lifted up by the pressing plate 50 as the compressing mechanism 58 is shifted from the nonoperating position shown in FIG. 2 to the operating position shown in FIG. 3.

The conveying mechanism 56 is provided with a stopper mechanism 98 for stopping and locating the stack of paper P carried in the drilling section X. The stopper mechanism 98 has a pair of stopper pins 100 which abut against the delivery side end face of the stack of paper P to regulate the position thereof. The stopper pins 100 vertically penetrate the table 12, and can move up and down. A retaining member 102 is disposed on the top of the table 12, retaining the upper end portions of the stopper pins 100. The retaining member 102 is provided with a rotary solenoid 104 and a link mechanism 106 which converts a rotatory motion of the rotary solenoid 104 into a vertical straight motion, and transmits such straight motion to the stopper pins 100. Holes (not shown) in which the stopper pins 100 can be inserted are bored through those portions of the pressing plate 50 which face the lower ends of the stopper pins 100. Even though the compressing mechanism 58 is brought to the operating state, therefore, the stopper pins 100 will never hinder the action of the pressing plate 50, as shown in FIG. 3.

Further, the conveying mechanism 56 is provided with auxiliary endless belts 108 corresponding to the aforementioned belts 78 on the supply side. These auxiliary endless belts 108 are stretched between a common driven roller 110 and a second driving roller 112.

As shown in FIG. 1, drillings removing mechanism 114 is disposed on the top of the table 12. The drillings removing mechanism 114 is intended to remove drillings 116 from the drills 62, the drillings 116 remaining within the drills 62 after drilling, has pins 118 corresponding to the upper ends of the drills 62.

The lower ends of the pins 118 are located in holes 120 which are vertically bore through the table 12 so that the upper ends of the drills 62 can be inserted in the holes 120. The pins 118 are narrow enough to be inserted in their corresponding drills 62. Fitted in each hole 120 is a bush 122 for correctly leading each pin 118 into its corresponding drill 62.

All the pins 118 are held at their middle portions by a common pin mounting plate 124. A frame 126 is disposed on the top of the table 12 so as to surround the pin mounting plate 124. The frame 126 includes a pair of vertical frame portions 128 extending upright from the top of the table 12, and a horizontal frame portion 130 parallel to the table 12 and connecting the respective upper ends of the two vertical frame portions 128. The upper ends of the pins 118 penetrate the horizontal frame portion 130 to extend upward therefrom. Springs 132 are severally wound around the portions of the projected pins 118 between the horizontal frame portion 130 and the pin mounting plate 124. These springs 132 urge the pin mounting plate 124 downward.

The pin mounting plate 124 urged by the springs 132 abuts against the cam surfaces of a pair of eccentric cams 134. These eccentric cams are mounted on a common shaft 136 in the same state of eccentricity. The shaft 136 is rotatably supported in the pair of vertical frame portions 128 and penetrates the same. A driven gear 138 is coaxially fixed to one end of the shaft 136. The driven gear 138 is driven by a fourth driving mechanism 139.

Figure 4:
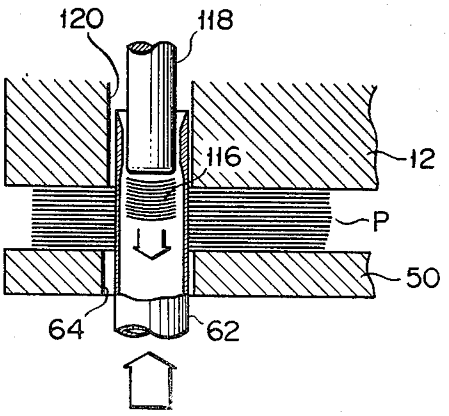
FIG. 4 is an enlarged, partial sectional view showing the principal part of a drillings removing mechanism.

When the second movable base 32 reaches its uppermost position, that is, when the drilling of the stack of paper P is completed, the upper end of each drill 62 is located in its corresponding hole 120 of the table 12, as shown in FIG. 4. By the rotation of the shaft 136, the lower ends of the pins 118 are inserted into their corresponding drills 62, and the drillings 116 remaining in the drills 62 are taken out therefrom.

As shown in FIG. 1, disposed on the top of the horizontal frame portion 130 of the frame 126 is a detecting switch 140 for detecting the lowermost position of the pins 118. The detecting switch 140 detects the lowermost position of the pins 118 when it is touched by a projection 142 attached to the upper end of one of the pins 118.

Figure 5:
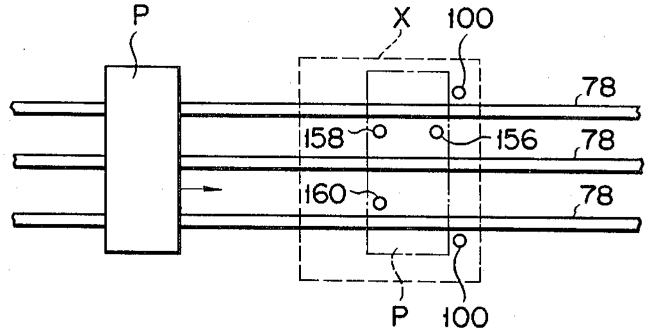
FIG. 5 is a top view showing a drilling section and its vicinity in the conveying mechanism.

As shown in FIGS. 2 and 5, three holes 144, 146 and 148 are vertically bored through the pressing plate 50. The first hole 144 is located so as to be adjacent to the forward end of the stack of paper P when the paper P is in contact with the stopper pins 100. In this state, the second and third holes 146 and 148 are aligned so as to be adjacent to the backward end of the stack of paper P. Fourth to sixth holes 150, 152 and 154 coaxially facing the first to third holes 144, 146 and 148 are bored through the table 12 respectively. Fitted in the first to third holes 144, 146 and 148 are light emitting diodes 156, 158 and 160 which emit light beams in the upward direction. Fitted in the fourth to sixth holes 150, 152 and 154, on the other hand, are light receiving elements 162, 164 and 166 capable of receiving the light beams from the light emitting diodes 156, 158 and 160.

Figure 6:
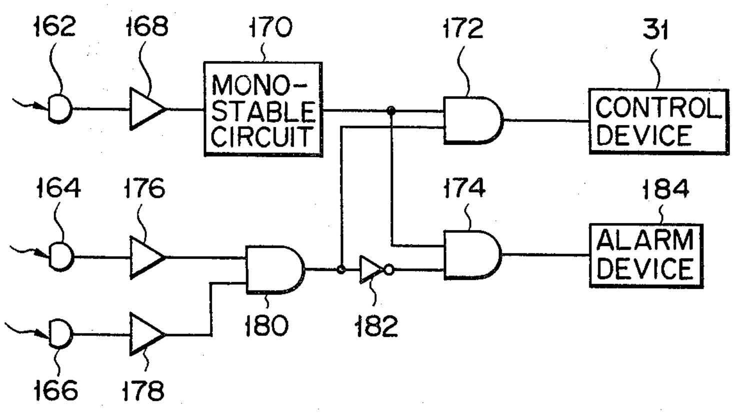
FIG. 6 is a circuit diagram showing the electrical connections between light receiving elements and control and alarm devices.

The light receiving elements 162, 164 and 166 severally produce "0"-level output signals when they receive the light beams, and produce "1"-level output signals when they receive no light beams. As shown in FIG. 6, the first light receiving element 162 in the fourth hole 150 is connected to the respective one input terminals of first and second AND circuits 172 and 174 through a first amplifier circuit 168 and a monostable circuit 170. The second and third light receiving elements 164 and 166 are connected to one and in the other input terminals of a third AND circuit 180 through second and third amplifier circuits 176 and 178, respectively. The output terminal of the third AND circuit 180 is connected to the other input terminal of the second AND circuit 174 through an inverter circuit 182 and to the other input terminal of the first AND circuit 172. The output terminal of the first AND circuit 172 is connected to the control device 31 for giving instructions for the start of drilling operation, while the output terminal of the second AND circuit 174 is connected to an alarm device 184 which produces alarm signals.

Now there will be described the operation of the drilling machine of the above-mentioned construction.

First, the conveying mechanism 56 is actuated, and the stack of paper P is carried into the drilling section X by the three belts 78. The stack of paper P abuts against the previously lowered stopper pins 100 of the stopper mechanism 98, and is stopped at a predetermined position as shown in FIG. 2. Then, the first light receiving element 162 for the forward end detection detects that the stack of paper P is set in the predetermined position. On such detection, an output signal delivered from the first light receiving element 162 is amplified by the first amplifier circuit 168, and applied as a trigger signal to the monostable circuit 170. The monostable circuit 170 produces an output signal after the passage of a given time, e.g. a time required for the correction of skew, if any, of the stack of paper P by the contact with the stopper pins 100, since the circuit 170 is triggered. If both the second and third light receiving elements 164 and 166 have already detected the backward end of the stack of paper P when the output signal is delivered from the monostable circuit 170, the first and second AND circuits 172 and 174 will be enabled and disabled respectively. As a result, a start signal is delivered from the first AND circuit 172 to the control device 31.

If at least one of the second and third light receiving elements 164 and 166 has failed to detect the backward end when the output signal is delivered from the monostable circuit 170, then the second and first AND circuits 180 and 174 will be enabled and disabled respectively. In this state, the stack of paper P may be skew or may have passed the drilling section X because of its unsatisfactory stopping at the stopper pins 100. In response to an output signal from the second AND circuit 180, therefore, the alarm device 184 produces the alarm signal.

When it is detected by means of the first AND circuit 172 that the stack of paper P is stopped at the predetermined position, the belts 78 stop, and the compressing mechanism 58 starts. That is, the first driving shaft 27 is driven by the first driving mechanism 30 to rotate in the forward direction to raise the first movable base 16.

As the first driving shaft 27 is rotated in the forward direction, the screw portion 26 rotates in the direction of the arrow A of FIG. 1 to move the first movable base 16 upward with the aid of the ball screw 20. Accompanying the rise of the first movable base 16, the second movable base 32, which is axially coupled in one with the first movable base 16 by means of the ball screw 36, and the pressing plate 50, which is elastically coupled with the first movable base 16 by means of the guide shaft 52 and the springs 54, both rise.

Accompanying the rise of the pressing plate 50, the stack of paper P maintained in the predetermined position by the three belts 78 is elastically pressed against the under surface of the table 12 by the urging force of the coil spring 54 to be compressed, as shown in FIG. 3. When the first movable base 16 reaches its uppermost position to cause the pressing plate 50 fully to compress the stack of paper P, the first driving mechanism 30 ceases to rotate the first driving shaft 27. In this stop position, the upper ends of the drills 62 are located inside and near the upper edges of their corresponding holes 120.

In this state, the stopper mechanism 98 is released from the operating position, the second driving mechanism 46 starts to rotate the second driving shaft 44 in the direction of the arrow B of FIG. 1, and the third driving mechanism 73 starts to rotate the third driving shaft 72 in the direction of the arrow C. As the second driving shaft 44 rotates, the ball screw 36 rotates in the opposite direction to the arrow B, and only the second movable base 32 rises additionally. Accompanying the additional rise of the second movable base 32, the drills 62, which are attached to the base 32 by means of the drill holders 60, also rise. As the third driving shaft 72 rotates, on the other hand, the drills 62 start to rotate with the aid of the driving gear 70 and the driven gears 68. Accompanying the rise of the second movable base 32, therefore, drilling of the stack of paper P is started.

The drilling operation is finished when the tip ends of the drills 62 pass through the stack of paper P to be located in the holes 120. In consequence, the second and third driving mechanisms 46 and 73 cease to drive the second and third driving shafts 44 and 72. In this state, the drillings 116 gouged out from the stack of paper P by the drills 62 remain in the drills 62, pressed in by the pins 118 as shown in FIG. 4.

The moment the drilling operation by the drilling mechanism 76 is completed, the drillings removing mechanism 114 starts operation. That is, the fourth driving mechanism 139 starts to rotate the shaft 136 with the aid of the driven gear 138. Accompanying the rotation of the shaft 136, the pair of eccentric cams 134 rotate, and the pin mounting plate 124 in contact with the eccentric cams 134 is biased downward by the urging force of the spring 132. Accordingly, the pins 118 mounted on the pin mounting plate 124 extrude the drillings 116 from the drills 62. The extruded drillings 116 are collected in a drillings collecting box (not shown).

When the pins 118 reach their lowermost position which is low enough to extrude the drillings 116, the projection 142 comes in contact with the detecting switch 140 to operate the same. As the detecting switch 140 is operated, a control signal is applied to the control device 31, which controls the drive of the first and second driving mechanisms 30 and 46. In response to such drive control, the first and second driving mechanisms 30 and 46 rotate the first and second driving shafts 27 and 44, respectively and simultaneously, in the reverse directions, that is, in the opposite directions to the arrows A and B of FIG. 1. Accompanying the reverse rotation of the first driving shaft 27, the first movable base 16 is lowered, so that the second movable base 32 is also lowered. Accompanying the reverse rotation of the second driving shaft 44, moreover, the second movable base 32 is lowered independently. Accordingly, the second movable base 32 is lowered while shortening the distance between itself and the descending first movable base 16. Thus, the release of the stack of paper P from the compressive force and the evulsion of the drills 62 are executed at the same time.

Accompanying the detecting operation of the detecting switch 140, on the other hand, the fourth driving mechanism 139 rotates the shaft 136 with the aid of the driven gear 138 so that the pin mounting plate 124 abutting against the eccentric cams 134 may be maintained in its uppermost position. Therefore, the pins 118 are pulled up until their tip ends are located in their corresponding holes 120.

Figure 7:
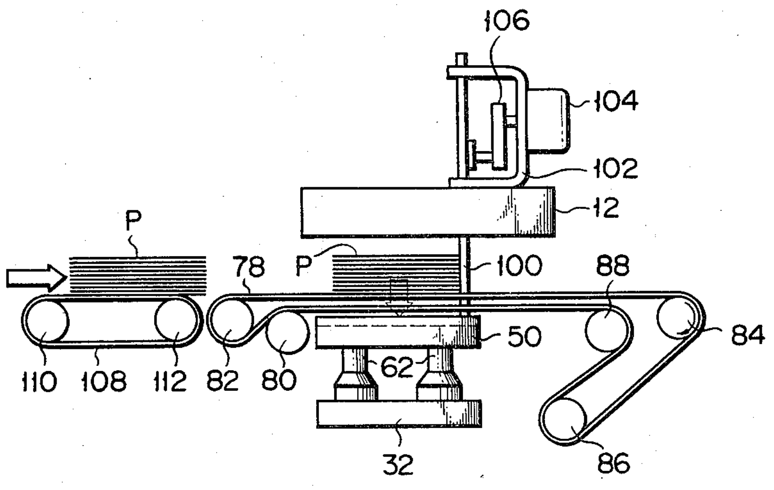
FIG. 7 is a side view for illustrating the operation of the conveying mechanism.

When the first and second movable bases 16 and 32 reach their initial lowermost positions, the pressing plate 50 also returns to its initial lowermost position, and the stack of drilled paper P is again laid on the three belts 78. Prior to this, the stopper pins 100 of the stopper mechanism 98 are pulled up immediately on completion of the compression of the stack of paper P by the pressing plate 50, as mentioned before. As the belts 78 travel, therefore, the stack of drilled paper P on the belts 78 is carried out from the drilling section X. Then, another stack of paper P previously laid on the auxiliary belts 108, as shown in FIG. 7, is transferred to the belts 78, and carried into the drilling section X.

Now there will be described a case where the pins 118 fail to reach their lowermost position. If the whole stack of paper P cannot be drilled due to unsatisfactory drilling operation, the pins 118 cannot reach the lowermost position. As a result, the detecting switch 140 does not perform detecting operation. Even if the detecting operation is not performed, however, the control device 31 controls the drive of the first and second driving mechanisms 30 and 46 to rotate the first and second driving shafts 27 and 44 in the reverse directions when it detects that the first and second movable bases 16 and 32 have been maintained in their respective uppermost positions for a given time. Thereafter, the stack of inadequately drilled paper P is carried out from the drilling section X in the aforesaid manner.

Figure 8:
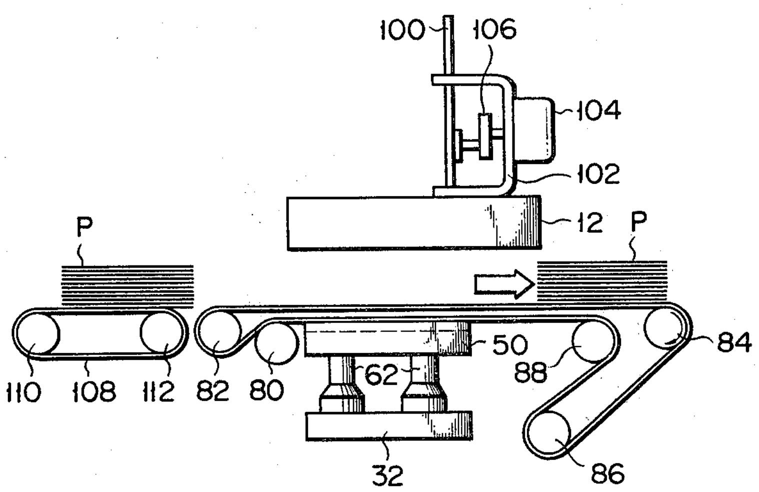
FIG. 8 is a side view showing the conveying mechanism in an operating position different from the one shown in FIG. 7.

In controlling the drive of the first and second driving mechanisms 30 and 46, the control device 31 stops the drive for the rotation of the driving roller 112 for driving the auxiliary belts 108, although the detecting switch 140 is not operated. As shown in FIG. 8, therefore, the next stack of paper P on the auxiliary belts 108 cannot be carried onto the belts 78, failing to reach the drilling section X. After a time long enough to carry out the stack of inadequately drilled paper P from the drilling section X has passed, the control device 31 stops the drive for the rotation of the driving roller 84.

Thus, in case of defective drilling, the drilling machine according to this embodiment carries out the stack of defectively drilled paper P from the drilling section X and stops its operation, keeping the next stack of paper P away from the drilling section X.

Here the defective drilling involves a case where the stack of paper P is not drilled at all.

This invention is not limited to the above-mentioned embodiment, and various changes and modifications may be effected without departing from the scope or spirit of the invention.

Figure 9:
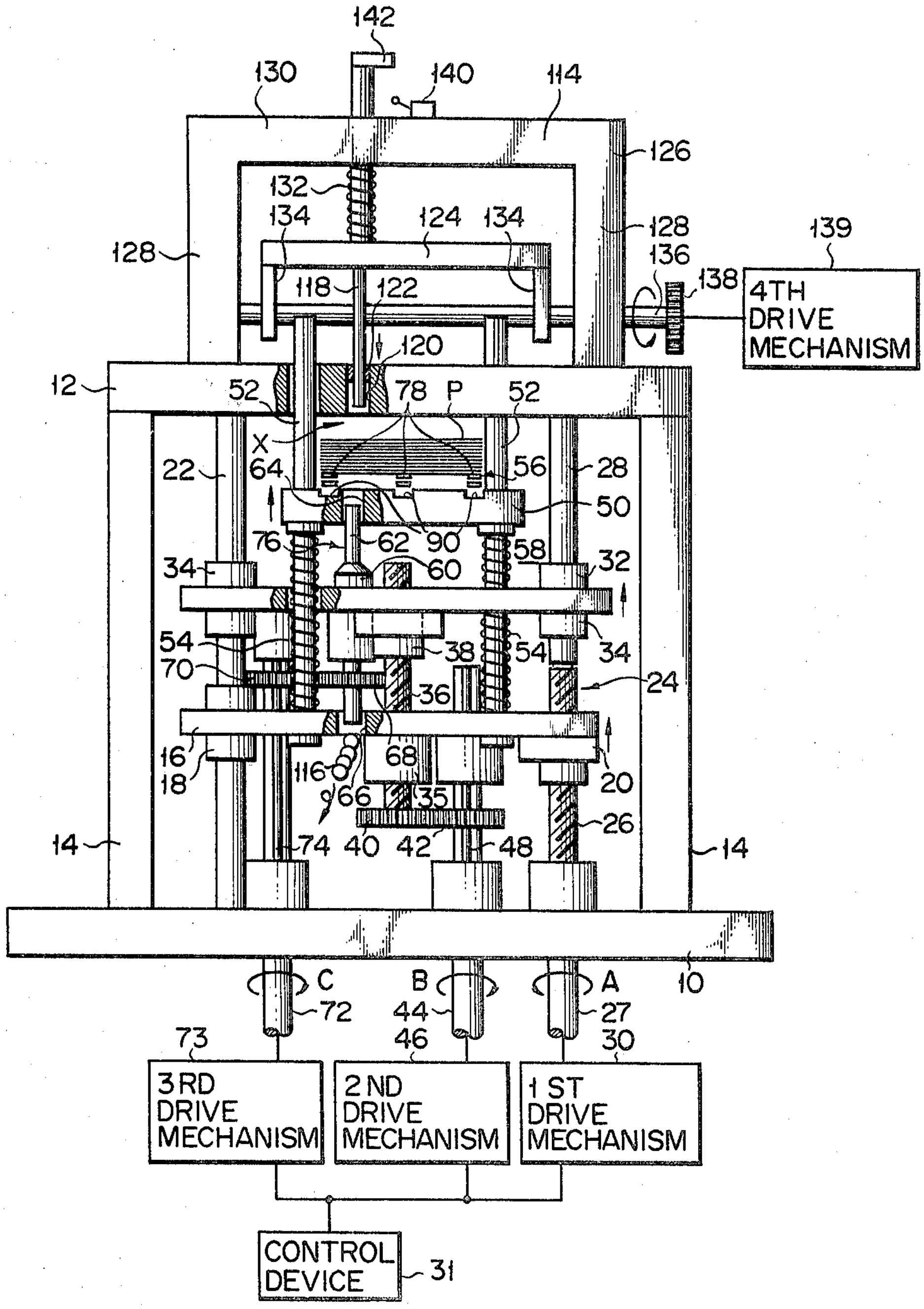
FIG. 9 is a front view showing another embodiment of the drilling machine according to the invention.

For example, the drills 62 used in the above embodiment are four in number. However, such number is not limited to four, and a single drill may suffice, as shown in FIG. 9. In this alternative embodiment, like reference numerals are used to designate the same portions included in the foregoing embodiment, and description of such portions is omitted. Where only a single drill 62 is provided, it is apprehended that the stack of paper P may be turned as the drill 62 rotates. Accordingly, the stopper pins 100 of the stopper mechanism 98 are pulled up after the stack of drilled paper P is released from the compression and the drill 62 is pulled out.

In the foregoing embodiment, moreover, the stack of defective drilled paper P is outside the drilling section X when it is stopped. However, this invention is not limited to such arrangement. For example, the stack of paper P may be stopped at a position inside the drilling section X, as indicated by a chain line in FIG. 5. Also in this case, an operator may easily remove the stack of defectively drilled paper P.

What we claim is:

1. A drilling machine for drilling a stack of paper, which comprises:

a fixing frame including a base plate and an upper plate disposed above and substantially parallel to the base plate;

a pressing plate disposed within the fixing frame, substantially parallel to the upper plate and the base plate, movable between the upper plate and base plate along an axis perpendicular to the base plate, paper to be drilled being disposed between the pressing plate and the upper plate;

a first movable member disposed between the pressing plate and base plate, and movable along said axis;

elastic supporting means disposed between the pressing plate and first movable member, for biasing the pressing plate toward the upper plate;

a second movable member movable along said axis;

a drilling mechanism rotatably supported by said second movable member and movable along said axis with said second member for drilling the stack of paper pressed by the pressing plate;

a first driving mechanism for moving said first movable member in a direction to compress the stack of paper and in the other direction to release the stack of paper from said compression;

a second driving mechanism for driving said second movable member to move in a direction to cause said drilling mechanism to drill the stack of paper and another direction to separate said drilling mechanism from the stack of paper; and a control device for causing said first and second driving mechanisms simultaneously to drive said first and second movable members respectively in said other directions, whereby the stack of drilled paper is released from said compression and said drilling mechanism is separated from the stack of drilled paper.

2. The drilling machine according to claim 1, which further includes first and second ball screws coupled said first and second driving mechanisms with said first and second movable members, respectively, said first and second ball screws being rotated in a forward direction and a reverse direction, thereby causing said first and second driving mechanisms to move said first and second movable members in one and the other direction, respectively.

3. The drilling machine according to claim 2, wherein said second movable member is disposed between said pressing plate and said first movable member.

4. The drilling machine according to claim 3, wherein said second movable member is coupled with said first movable member so that said second movable member move in the same direction with said first movable member, accompanying the movement of said first movable member.

5. The drilling machine according to claim 4, wherein said second ball screw penetrates said first movable member and said machine further comprises means for permitting said second ball screw to rotate while prohibiting said second ball screw from moving in the axial direction with respect to said first movable member.

6. The drilling machine according to claim 5, wherein said drilling mechanism includes a plurality of drills.

7. The drilling machine according to claim 6, wherein each said drill has an axially penetrating hollow portion.

8. The drilling machine according to claim 7, which further comprises a drillings removing mechanism including pins severally corresponding to said drills and capable of being inserted in the hollow portions of their corresponding drills, and a driving mechanism for inserting said pins in the hollow portions of said drills from initial positions, whereby drillings collected in the hollow portions of said drills are removed from said drills.

9. The drilling machine according to claim 8, wherein said drillings removing mechanism includes a detector for detecting the distance for which said pins have moved from initial positions, said detector supplying said control device with a detection signal telling that drilling has been performed only unsatisfactorily when said pins have failed to move a predetermined distance.

10. The drilling machine according to claim 9, wherein said control device receives said detection signal and produces an output signal for stopping all the driving action after the stack of paper is released from the compression.

11. The drilling machine according to claim 5, wherein said drilling mechanism includes a single drill and stopper pins abutting against an end face of the stack of paper to prevent rotation thereof.

12. The drilling machine according to claim 11, wherein said drill has an axially penetrating hollow portion.

13. The drilling machine according to claim 12, which further comprises a drillings removing mechanism including a pin disposed correspondingly to said drill and capable of being inserted in the hollow portion of said drill, and a driving mechanism for inserting said pin in the hollow portion of said drill from an initial position, whereby drillings collected in the hollow portion of said drill are removed from said drill.

14. The drilling machine according to claim 13, wherein said drillings removing mechanism includes a detector for detecting the distance for which said pin has moved from the initial position, said detector supplying said control device with a detection signal telling that drilling has been performed only unsatisfactorily when said pin has failed to move a predetermined distance.

15. The drilling machine according to claim 14, wherein said control device receives said detection signal and produces an output signal for stopping all the driving action after the stack of paper is released from the compression.

16. The drilling machine according to claim 1, 2, 3, 4, 5, 6, 7, 8, 9, 10, 11, 12, 13, 14 or 15, which further comprises a conveying mechanism for conveying the stack of paper, said conveying mechanism including a plurality of endless belts for carrying the stack of paper and a plurality of rollers collectively supporting said endless belts.

17. The drilling machine according to claim 16, wherein at least one of said rollers is rotatably mounted on said first movable member.

18. The drilling machine according to claim 16, wherein both forward and backward paths of said endless belts are located between said table and said pressing plate.

19. The drilling machine according to claim 18, wherein said pressing plate has grooves to engage said belts on those portions of said pressing plate which face said belts respectively, whereby both forward- and backward-path portions of said belts sustaining the stack of paper are fitted in their corresponding grooves, and the stack of paper is laid on said pressing plate when said pressing plate is moved to press the stack of paper.

20. The drilling machine according to claim 16, wherein said conveying mechanism includes a means for stopping the stack of paper carried on said belts at a predetermined position between said table and said pressing plate, and a detecting means for detecting that the stack of paper has reached said predetermined position and supplying a drilling start signal to said control device.

* * * * *